United States Patent
Saito et al.

(10) Patent No.: US 8,422,943 B2
(45) Date of Patent: *Apr. 16, 2013

(54) RELAY STATION IN MOBILE COMMUNICATION SYSTEM, MOBILE STATION, AND RELAY TRANSMISSION METHOD

(75) Inventors: Yoshiko Saito, Kanagawa (JP); Takashi Aramaki, Osaka (JP); Kenichi Miyoshi, Kanagawa (JP); Megumi Ichikawa, legal representative, Kanagawa (JP); Katsuhiko Hiramatsu, Kanagawa (JP); Hideshi Taki, Kanagawa (JP); Daichi Imamura, Kanagawa (JP); Ayako Horiuchi, Kanagawa (JP); Yuichi Kobayakawa, Cupertino, CA (US)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/919,366

(22) PCT Filed: Feb. 26, 2009

(86) PCT No.: PCT/JP2009/000867
§ 371 (c)(1),
(2), (4) Date: Jan. 4, 2011

(87) PCT Pub. No.: WO2009/107385
PCT Pub. Date: Sep. 3, 2009

(65) Prior Publication Data
US 2011/0105016 A1    May 5, 2011

(30) Foreign Application Priority Data
Feb. 27, 2008   (JP) .................................. 2008-046418

(51) Int. Cl.
*H04B 7/15*   (2006.01)

(52) U.S. Cl.
USPC .......................................... 455/11.1; 455/13.1

(58) Field of Classification Search ................. 455/3.02, 455/427, 428, 430, 431, 7–9, 11.1, 12.1, 455/13.1, 13.2, 14–17; 340/425.1; 370/226, 370/293, 246, 274, 279, 315, 316, 492, 501
See application file for complete search history.

(56) References Cited

U.S. PATENT DOCUMENTS 5,787,338 A * 7/1998 Priest .............................. 455/69
5,960,364 A * 9/1999 Dent ........................... 455/552.1
(Continued)

FOREIGN PATENT DOCUMENTS

EP   1 152 559    11/2001
JP   3-283724     12/1991
(Continued)

OTHER PUBLICATIONS

International Search Report dated Apr. 7, 2009.

*Primary Examiner* — Dominic E Rego
(74) *Attorney, Agent, or Firm* — Dickinson Wright PLLC

(57) ABSTRACT

Provided is a mobile communication system capable of eliminating the use of a control channel for transmitting specific area information and suppressing the overhead caused by a frequency change process for a mobile station to receive the specific area information. In the mobile communication system, a relay station (20) has a coverage area (21) (specific area) and relays and transmits, in the coverage area (21), a signal received from a base station (10) to a mobile station (30). The relay station (20) adds, to the signal received from the base station (10), the offset of any of a frequency offset, a time offset, and a power offset depending on a risk indicated by risk information in the coverage area (21) (specific area) and transmits the signal after the addition of the offset to the mobile station (30) located in the coverage area (21).

7 Claims, 11 Drawing Sheets

U.S. PATENT DOCUMENTS

| | | | |
|---|---|---|---|
| 6,640,112 B1 | 10/2003 | Lee | |
| 7,139,527 B2 * | 11/2006 | Tamaki et al. | 455/16 |
| 7,599,341 B2 * | 10/2009 | Ramachandran | 370/338 |
| 7,822,427 B1 * | 10/2010 | Hou | 455/456.2 |
| 7,929,905 B1 * | 4/2011 | Warner et al. | 455/7 |
| 8,031,818 B2 * | 10/2011 | Lee et al. | 375/344 |
| 2003/0204371 A1 * | 10/2003 | Sciamanna | 702/183 |
| 2004/0233874 A1 * | 11/2004 | Baker | 370/335 |
| 2005/0130672 A1 * | 6/2005 | Dean et al. | 455/456.1 |
| 2005/0190821 A1 | 9/2005 | Fujii | |
| 2008/0013606 A1 * | 1/2008 | Boariu et al. | 375/211 |
| 2008/0045148 A1 * | 2/2008 | Okuda | 455/18 |
| 2008/0107073 A1 * | 5/2008 | Hart et al. | 370/330 |
| 2008/0130723 A1 * | 6/2008 | Lee et al. | 375/211 |
| 2009/0081963 A1 * | 3/2009 | Boren | 455/90.1 |
| 2009/0116420 A1 * | 5/2009 | Jeong et al. | 370/312 |
| 2011/0310767 A1 * | 12/2011 | Hu | 370/252 |

FOREIGN PATENT DOCUMENTS

| | | |
|---|---|---|
| JP | 2001-168792 | 6/2001 |
| JP | 2001-169355 | 6/2001 |
| JP | 2005-167850 | 6/2005 |
| JP | 2005-229524 | 8/2005 |

\* cited by examiner

| DIRECTION θ FROM RELAY STATION 20 | AMOUNT OF FREQUENCY OFFSET IN NEIGHBORING RELAY STATIONS [Hz] |
|---|---|
| 0° (NORTH) ≦ θ <60° | 3000 |
| 60° ≦ θ <120° | 2000 |
| 120° ≦ θ <180° (SOUTH) | 2000 |
| 180° ≦ θ <240° | 1000 |
| 240° ≦ θ <300° | 3000 |
| 300° ≦ θ <360° | 3000 |

FIG.8

RELAY STATION IN MOBILE COMMUNICATION SYSTEM, MOBILE STATION, AND RELAY TRANSMISSION METHOD

TECHNICAL FIELD

The present invention relates to a relay station, mobile station and relay transmission method in mobile communication systems.

BACKGROUND ART

In recent years, with the multimediatization of information in mobile communication systems, transmitting high capacity data such as still images and movies in addition to speech data has become popular. To realize the transmission of high capacity data, a technology in which a high-frequency radio band is used to provide a high transmission rate is studied.

However, when a high-frequency radio band is used, although a high transmission rate can be expected in a short distance, attenuation due to transmission distance becomes greater as the distance increases. Accordingly, when the mobile communication system employing a high-frequency radio band is operated, the coverage area of a radio communication base station apparatus (hereinafter "base station") becomes small, which requires that a larger number of base stations be set up in order to prevent the service area from reducing. Since the set-up of base stations involves large costs, a technology is strongly demanded for realizing communication services which employ a high-frequency radio band and for preventing an increase in the number of base stations.

To meet this demand, in order to expand coverage areas of base stations, relay transmission technologies are investigated in which a radio communication relay station apparatus (hereinafter "relay station") is set up between a radio communication mobile station apparatus (hereinafter "mobile station") and a base station, and in which communication between the mobile station and the base station is carried out via the relay station.

Meanwhile, in future mobile communication systems, studies will be conducted for services in which the base station employing various RATs (Radio Access Technologies) such as W-CDMA (Wideband Code Division Multiple Access), LTE (Long Term Evolution), WLAN (Wireless LAN), and WiMAX (Worldwide interoperability for Microwave Access) distributes information related to a specific area (i.e. specific area information) to that specific area in a coverage area of the base station. Then, with regards to these services, a mobile station needs to detect in which base station's coverage area the mobile station is currently located and which area's specific area information the mobile station can receive. For example, when part of a base station's coverage area includes a specific area, a mobile station located in the specific area cannot receive specific area information unless the mobile station is able to detect that the mobile station is located in the specific area.

Conventionally, Patent Document 1 discloses a technique of storing specific area information on a specific area in a coverage area of a base station under the base station control apparatus in memory, and of constantly transmitting the stored specific area information via the base station. A mobile station located inside the specific area then receives specific area information and shows the received information on a display. In this case, the mobile station switches a frequency band to the frequency band in which the base station transmits the specific area information, and receives the specific area information.

Patent Document 1: Japanese Patent Application Laid-Open No. 2001-169355

DISCLOSURE OF INVENTION

Problems to be Solved by the Invention

However, with the above conventional technique, each time a mobile station receives specific area information, the mobile station switches the frequency to the frequency in which the specific area information is transmitted. In this case, according to the above conventional technique, overhead for frequency switching is produced in a mobile station. Particularly, a mobile station needs to frequently receive specific area information updated over time (e.g. emergency information including hazard level information notifying a hazard level in a specific area) transmitted from a base station. Accordingly, the number of times the mobile station switches the frequency increases, and overhead for frequency switching further increases.

It is therefore an object of the present invention to provide a relay station, a mobile station and a relay transmission method that eliminate the need of a control channel for transmitting specific area information, and reduce overhead in the mobile station due to frequency switching processing for receiving specific area information.

Means for Solving the Problem

The relay station of the present invention adopts a configuration including: a receiving section that receives a signal from a base station covering a first coverage area; an addition section that adds to the signal one of a frequency offset, a time offset and a power offset, in accordance with a level shown by specific area information in a second coverage area, partly or entirely included in the first coverage area; and a transmitting section that transmits, in the second coverage area, the signal with the offset to a mobile station.

The mobile station of the present invention adopts a configuration including: a receiving section that receives, in a first coverage area, a signal transmitted by a base station covering the first coverage area, and that receives a signal relayed by a relay station in a second coverage area, partly or entirely included in the first coverage area; and a detection section that, when one of a frequency offset, a time offset and a power offset is added to the received signal, based on the offset, detects a level shown by specific area information in the second coverage area.

The relay transmission method of the present invention includes the steps of: adding to a signal received from a base station covering a first coverage area, one of a frequency offset, a time offset and a power offset, in accordance with a level shown by specific area information in a second coverage area, partly or entirely included in the first coverage area; and transmitting, in the second coverage area, the signal with the offset to a mobile station.

Advantageous Effects of Invention

According to the present invention, it is possible to eliminate the need of a control channel for transmitting specific area information and reduce overhead in the mobile station due to frequency switching processing for receiving specific area information.

BRIEF DESCRIPTION OF DRAWINGS

FIG. 8 is a reference table in the relay station, according to Embodiment 2 of the present invention;

BEST MODE FOR CARRYING OUT THE INVENTION

Now, embodiments of the present invention will be described in detail with reference to the accompanying drawings. With the following explanation, LTE is used as an example of RATs.

Figure 1:
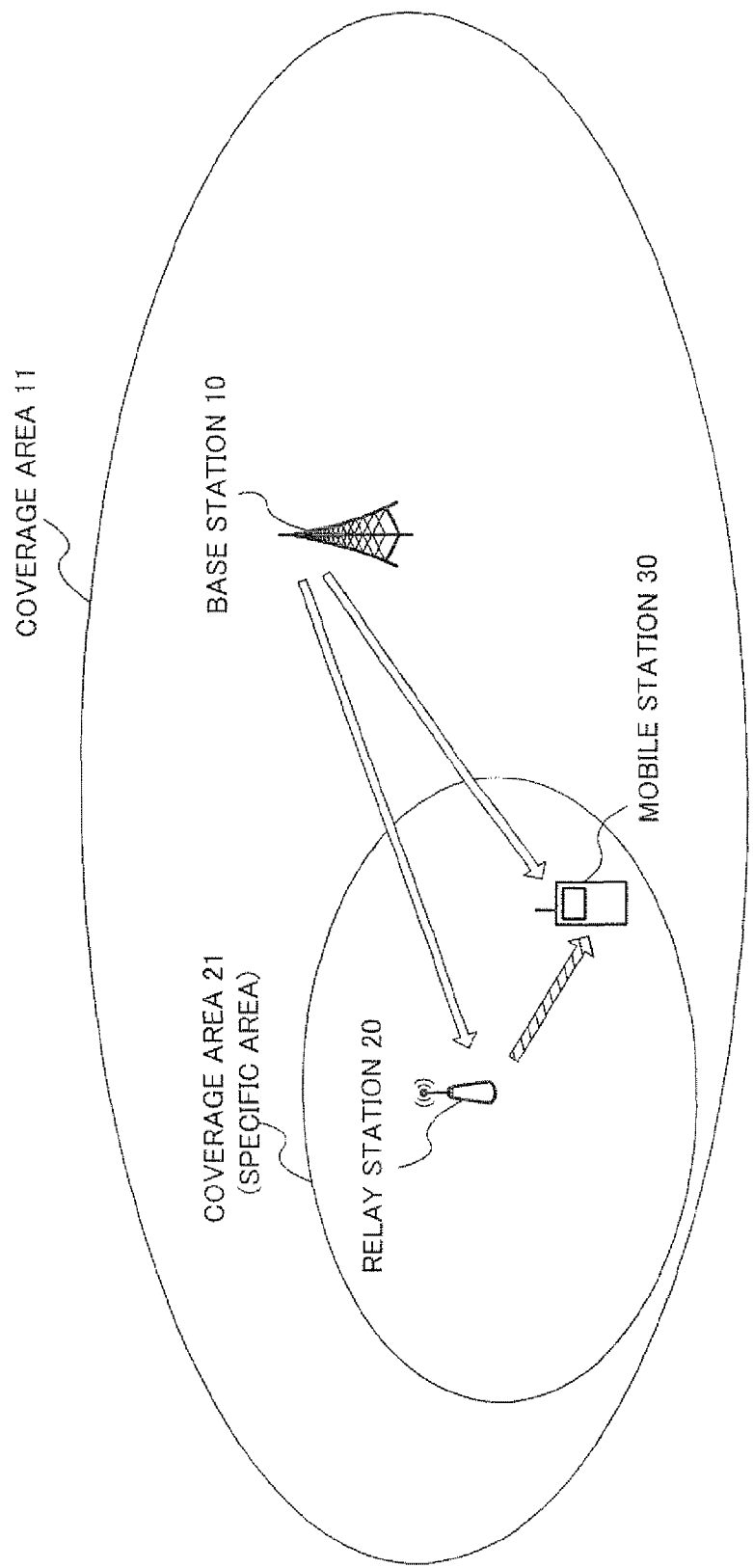
FIG. 1 illustrates a configuration of the mobile communication system according to embodiments of the present invention.

FIG. 1 shows a mobile communication system according to embodiments of the present invention. As shown in FIG. 1, with the mobile communication system according to the following embodiments, part of base station 10's coverage area 11 includes an entire relay station 20's coverage area 21, which is a specific area. That is, part of base station 10's coverage area 11 overlaps entire relay station 20's coverage area 21. Relay station 20 is set up in the specific area to which specific area information is wished to be distributed, in base station 10's coverage area 11. Further, with the following explanation, hazard level information showing a hazard level in a specific area will be explained as an example of specific area information showing a level. For example, the hazard level is represented between 0% and 100%, 0% of the hazard level is the least dangerous (i.e. safest) and 100% of the hazard level is the most dangerous.

Base station 10 covers coverage area 11 and transmits a signal in this coverage area 11. This signal is received by relay station 20 and mobile station 30. Relay station 20 covers coverage area 21 (specific area) and relays the signal received from base station 10 to mobile station 30, in this coverage area 21. That is, relay station 20 relays the signal from base station 10 only in coverage area 21. Consequently, mobile station 30 directly receives the signal transmitted by base station 10 in coverage area 11 and the signal relayed by relay station 20 in coverage area 21.

Further, relay station 20 adds to the relay signal hazard level information showing the hazard level in the relay station's coverage area (specific area). Specifically, relay station 20 adds to the signal received from base station 10 one of a frequency offset, a time offset and a power offset in accordance with the hazard level in coverage area 21 (specific area), and transmits the signal with an offset to mobile station 30 located in coverage area 21. The adding processing of an offset is performed in a layer lower than layer 1.

Accordingly, based on whether or not one of the above offsets is added to the received signal, mobile station 30 is able to detect whether or not the mobile station is located in relay station 20's coverage area 21 (specific area). Consequently, when mobile station 30 is located in coverage area 21 in coverage area 11, mobile station 30 is able to receive specific area information. Further, when an offset is added to the received signal, mobile station 30 detects the hazard level in relay station 20's coverage area 21 (specific area) based on the offset added to the received signal.

Embodiment 1

With the present embodiment, a case will be described where a frequency offset is added to a signal to be relayed.

Figure 2:
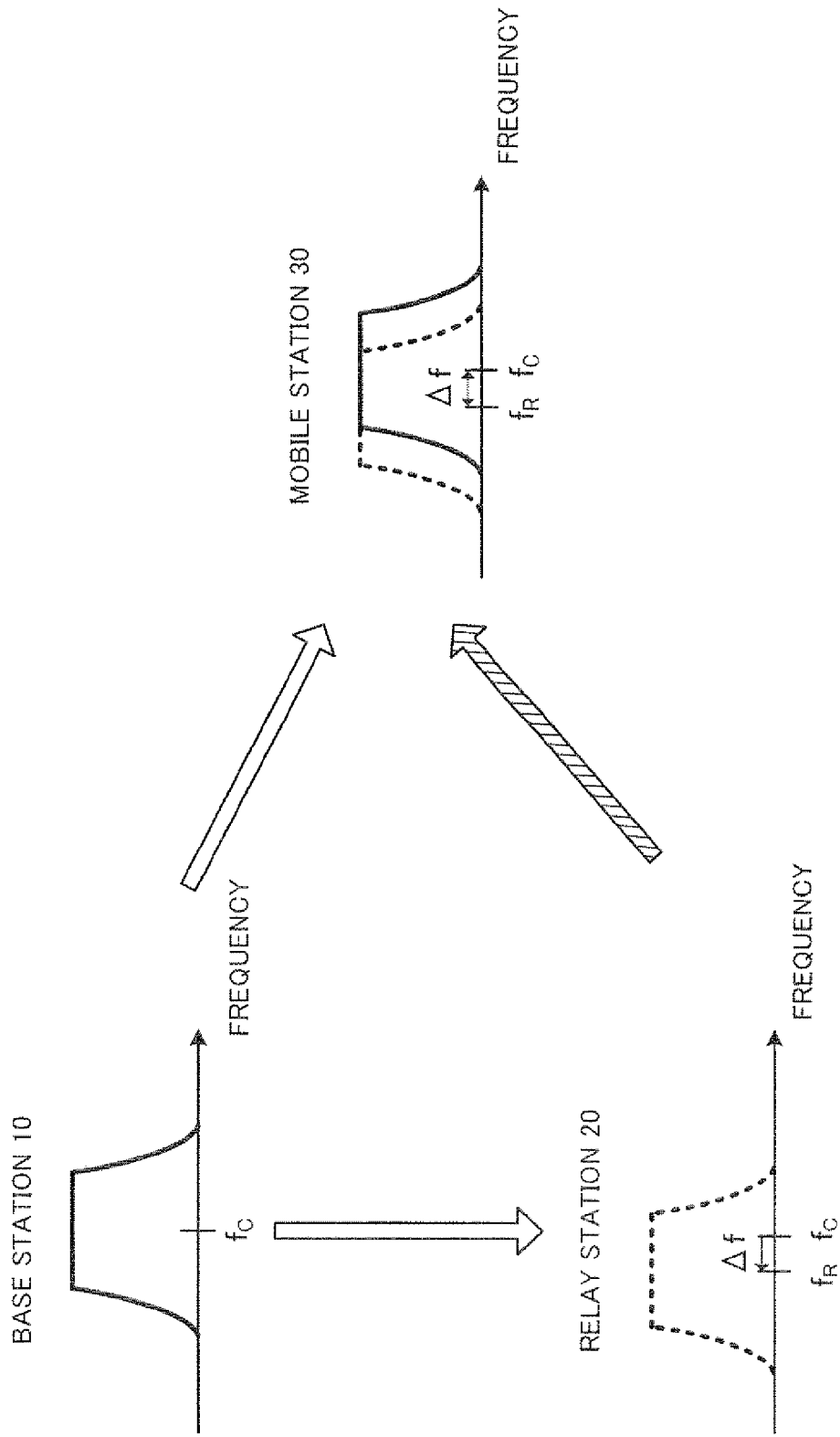
FIG. 2 illustrates an example of transmitting and receiving a signal according to Embodiment 1 of the present invention.

With the present embodiment, as shown in FIG. 2, base station 10 transmits a signal having a center frequency $f_C$.

When relay station 20 receives the signal from base station 10 and relays the signal to mobile station 30, relay station 20 adds frequency offset $\Delta f$ to the signal from base station 10, to shift the center frequency to $f_R$. The magnitude of $\Delta f$ varies depending on the hazard level shown by the hazard level information. For example, if hazard level information showing 10% of a hazard level is added, $\Delta f$ is 1000 Hz, and if hazard level information showing 30% of a hazard level is added, $\Delta f$ is 3000 Hz. In this way, relay station 20 controls the magnitude of frequency offset ($|\Delta f|$) in accordance with the hazard level in the specific area. Relay station 20 then relays the signal having the center frequency $f_R$ to mobile station 30.

Mobile station 30 decides whether or not mobile station 30 in the specific area based on whether or not frequency offset $\Delta f$ is added to the received signal. Further, if mobile station 30 detects $\Delta f$, based on the magnitude of $\Delta f$, the mobile station detects the hazard level shown by the hazard level information.

Mobile station 30, located in the overlapping part of base station 10's coverage area 11 and relay station 20's coverage area 21 (specific area), receives both the signal having center frequency $f_C$ and transmitted by base station 10 and the signal having center frequency $f_R$ and relayed by relay station 20, as shown in FIG. 2. Accordingly, mobile station 30, located in the overlapping part of base station 10's coverage area 11 and relay station 20's coverage area 21, can detect frequency offset $\Delta f = |f_R - f_C|$ added by relay station 20. For example, when $\Delta f$ detected from the received signal is 1000 Hz, mobile station 30 detects that the mobile station is located in relay station 20's coverage area 21 (specific area) and the hazard level is 10%. Further, for example, when $\Delta f$ detected from the received signal is 3000 Hz, mobile station 30 detects that the mobile station is located in relay station 20's coverage area 21 (specific area) and the hazard level is 30%.

On the other hand, mobile station 30, located outside the above overlapping part in base station 10's coverage area 11, receives only the signal having center frequency $f_C$ and transmitted by base station 10. Accordingly, mobile station 30, located outside the above overlapping part in base station 10's coverage area 11, cannot detect frequency offset $\Delta f$. For example, when $\Delta f$ is not added to a received signal, mobile station 30 detects that mobile station 30 is not located in relay station 20's coverage area 21 (specific area). That is, when frequency offset Δf is not added to the received signal, mobile station 30 is able to detect that the mobile station is located outside the specific area.

Next, an optimal value of frequency offset Δf will be explained.

Figure 3:
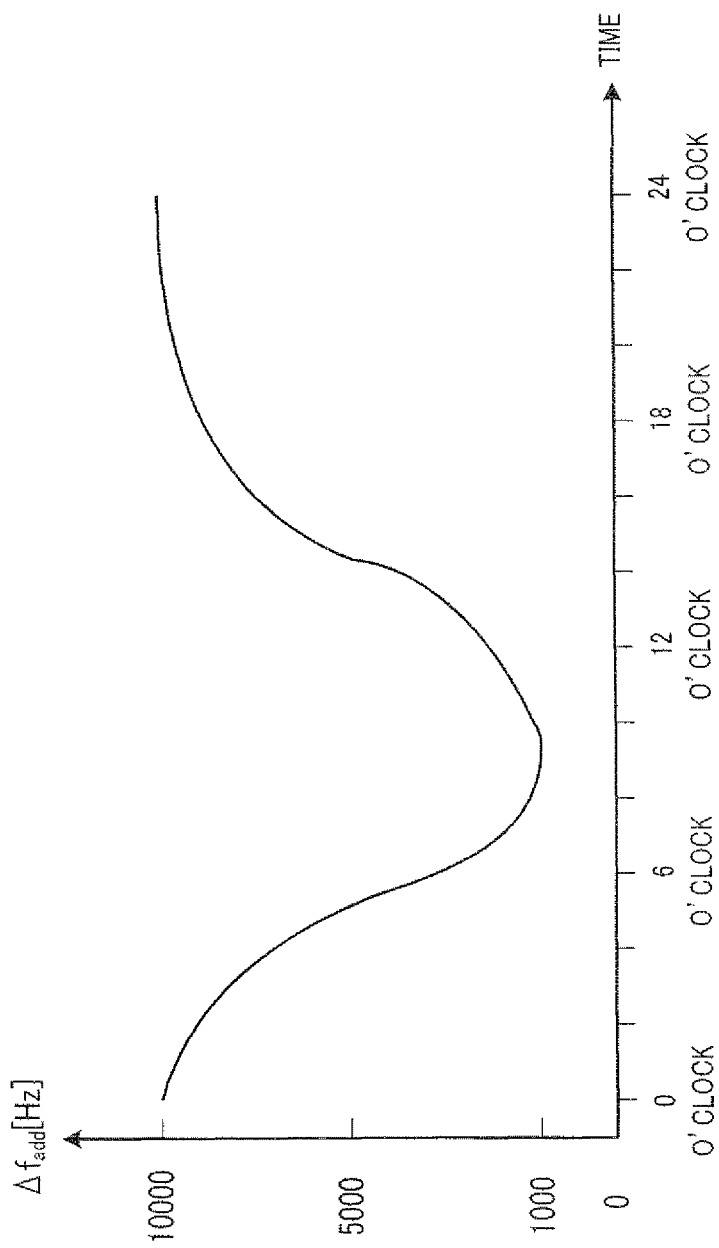
FIG. 3 illustrates associations between offsets in the relay station and time according to Embodiment 1 of the present invention.

In LTE, when the maximum downlink carrier frequency is 2690 MHz and the maximum moving speed of a mobile station is 350 km/h, the maximum frequency error due to crystal error in the mobile station upon detecting a coverage area (i.e. upon acquiring initial synchronization) is estimated, for example, ±0.1 ppm. This maximum frequency error refers to the error in the initial state of the crystal provided in the mobile station, that is, the error before synchronization acquisition. Accordingly, the maximum Doppler shift due to fading is 872 Hz and the maximum frequency error due to crystal error is 269 Hz. Accordingly, the maximum frequency error $f_{error\_max}$=(the maximum Doppler shift due to fading+the maximum frequency error due to crystal error)≈1141 Hz. Therefore, the value of frequency offset Δf added by relay station 20 needs to be within the range of $f_{detect}$ that can be detected in mobile station 30 and separable from the maximum frequency error $f_{error\_max}$≈1141 Hz. That is, to make detection easier, it is preferable that the value of Δf meets both condition (1) $\Delta f \leq f_{detect} - f_{error\_max}$ and condition (2) $\Delta f > 2 * f_{error\_max}$. Then, with the present embodiment, Δf where the hazard level of the hazard level information is 0% is set to $\Delta f_{default}$, which satisfies condition (2). Further, as shown in FIG. 3, in accordance with the time of a timer in relay station 20, $\Delta f_{add}$ adding to $\Delta f_{default}$ is determined. Accordingly, the offset Δf adding to a relay signal is $\Delta f_{default}$+$\Delta f_{add}$. Here, assume that $\Delta f_{add}$=(hazard level [%]×100) [Hz] shown in FIG. 3. Accordingly, for example, Δf in the case of 10% of a hazard level is $\Delta f_{default}$+1000 Hz. Similarly, Δf in the case of 50% of a hazard level is $\Delta f_{default}$+5000 Hz. Further, in the example shown in FIG. 3, $\Delta f_{add}$ is small and the hazard level becomes low from about five to fifteen o'clock, that is, about during daytime hours. Meanwhile, as shown in FIG. 3, $\Delta f_{add}$ is large and the hazard level becomes high from about fifteen to five o'clock, that is, about during nighttime hours.

Figure 4:
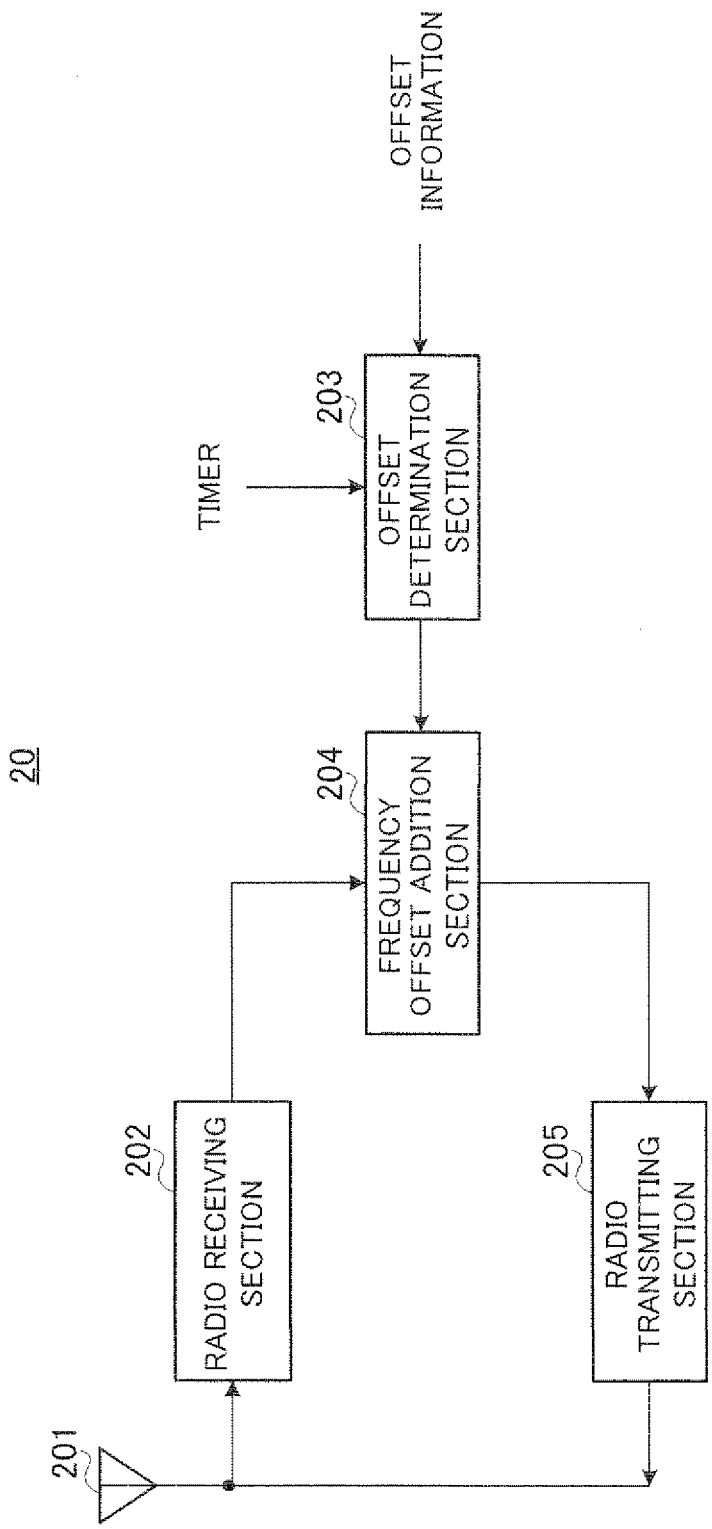
FIG. 4 is a block diagram showing the configuration of the relay station according to Embodiment 1 of the present invention.

Next, the configuration of relay station 20 according to the present embodiment will be described. FIG. 4 shows the configuration of relay station 20 according to the present embodiment.

In relay station 20 shown in FIG. 4, radio receiving section 202 receives a signal transmitted from base station 10 via antenna 201, and performs receiving processing including down-conversion and A/D conversion on the received signal, to output the resulting signal to frequency offset addition section 204.

Offset determination section 203, which has a table shown in FIG. 3 and designating associations between $\Delta f_{add}$ and time, determines frequency offset Δf with reference to the table based on the time shown on the inputted timer and the default offset $\Delta f_{default}$ shown in the offset information. For example, as shown in FIG. 3, if the timer shows 10 o'clock, $\Delta f_{add}$=1000 Hz, so that frequency offset Δf is determined to be $\Delta f_{default}$+1000 Hz. That is, at 10 o'clock, the hazard level shown by the hazard level information is 10%. Δf determined in offset determination section 203 is inputted to frequency offset addition section 204. Base station 10 may control and notify offset information to relay station 20, and relay station 20 itself may control offset information.

Frequency offset addition section 204 adds frequency offset Δf determined in offset determination section 203 to the signal received as input from radio receiving section 202, and outputs the signal with a frequency offset to radio transmitting section 205.

Radio transmitting section 205 performs transmitting processing including D/A conversion and up-conversion on the signal with the frequency offset, and relays the resulting signal from antenna 201 to mobile station 30.

Figure 5:
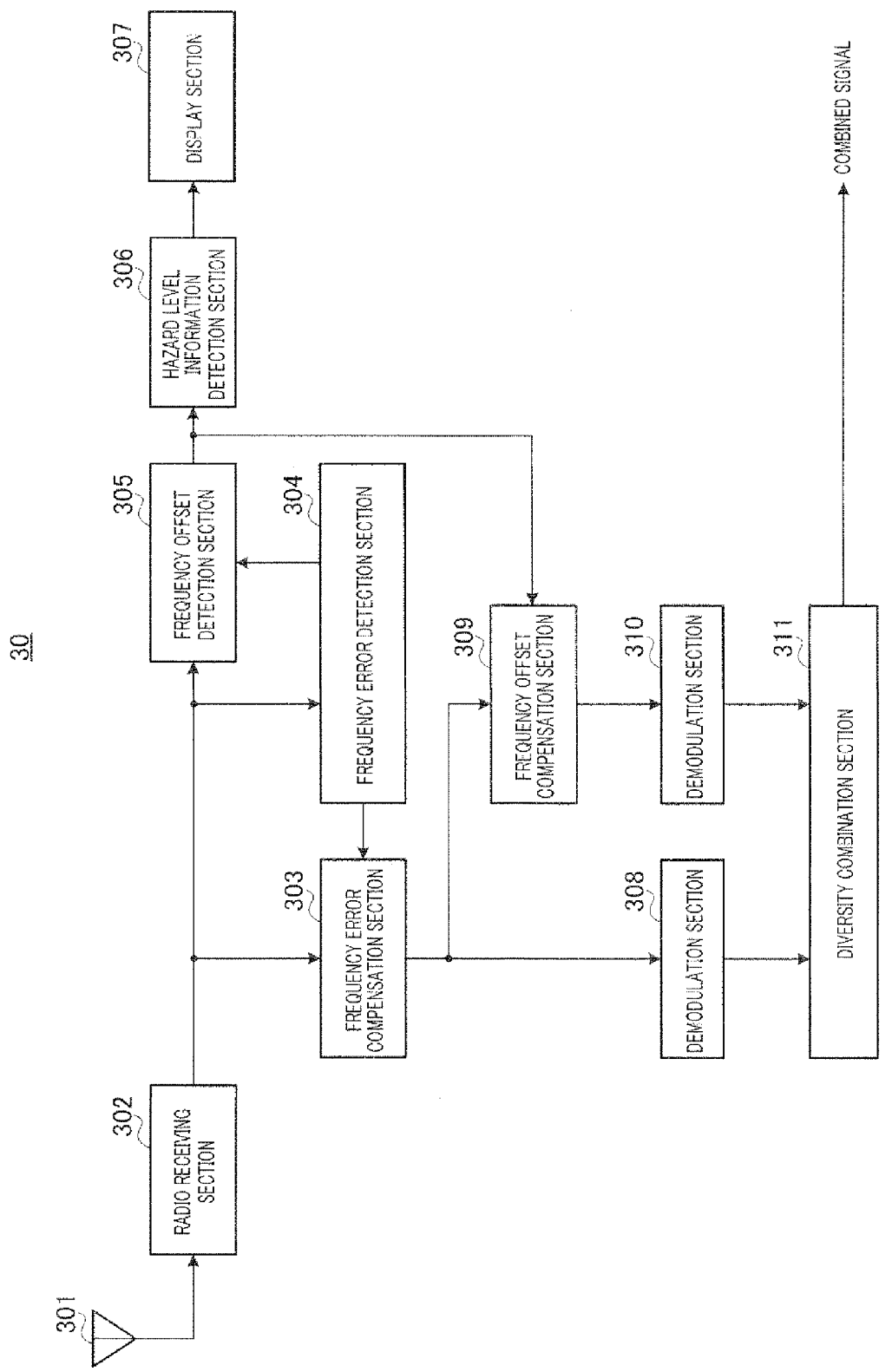
FIG. 5 is a block diagram showing the configuration of the mobile station according to Embodiment 1 of the present invention.

Next, the configuration of mobile station 30 according to the present embodiment will be described. FIG. 5 shows the configuration of mobile station 30 according to the present embodiment.

In mobile station 30 shown in FIG. 5, radio receiving section 302 receives only a signal from base station 10, or a signal from base station 10 and a signal from relay station 20 via antenna 301, and performs receiving processing including down-conversion and A/D conversion on each received signal, to output the resulting signal to frequency error compensation section 303, frequency error detection section 304 and frequency offset detection section 305.

Frequency error detection section 304 detects a frequency error $f_{error}$ of the received signal=(Doppler shift due to fading+frequency error due to crystal error) and outputs the detected frequency error to frequency error compensation section 303 and frequency offset detection section 305.

Frequency error compensation section 303 compensates for the frequency error $f_{error}$ of the received signal and outputs the signal after the frequency error compensation to demodulation section 308 and frequency offset compensation section 309.

Demodulation section 308 demodulates the signal after frequency error compensation and outputs the demodulated signal to diversity combination section 311.

Frequency offset detection section 305 detects frequency offset $\Delta f = |f_R - f_C|$, which is added to the received signal. The detected Δf is inputted to RAT detection section 306 and frequency offset compensation section 309.

Frequency offset compensation section 309 further compensates for the frequency offset Δf with the signal after frequency error compensation and outputs the signal after frequency offset compensation, to demodulation section 310.

Demodulation section 310 demodulates the signal after the frequency error compensation and the frequency offset compensation, and outputs the demodulated signal to diversity combination section 311.

Diversity combination section 311 diversity-combines the signal received as input from demodulation section 308 and the signal received as input from demodulation section 310 and outputs a combined signal.

Hazard level information detection section 306 detects the hazard level shown by hazard level information based on Δf detected by frequency offset detection section 305. For example, hazard level information detection section 306 calculates the hazard level from $f_{offset}/100$ [%]. Here, $f_{offset}$ is an estimated additional frequency offset showing an estimated value of $\Delta f_{add}$ added to $\Delta f_{default}$ in relay station 20, and is calculated from $f_{offset} = \Delta f - \Delta f_{default}$. For example, when $f_{offset}$ is 1000 Hz, the hazard level is 10%. Hazard level information detection section 306 then outputs the hazard level information designating the detected hazard level to display section 307.

Display section 307 shows the hazard level shown in the hazard level information received as input from hazard level information detection section 306 on a display screen. Display section 307 is not limited to displaying the hazard level on a display screen, and may notify the hazard level via voice or using a vibrator.

In this way, according to the present embodiment, a relay station adds, to a signal to be relayed, a frequency offset in accordance with the hazard level in the coverage area (specific area) of the relay station. By this means, a mobile station located in the specific area is able to detect that the mobile station is located in the specific area and detect the hazard level in the specific area using the frequency offset added to the relay signal. That is, a mobile station located in a specific area is able to detect hazard level information without requesting distribution of hazard level information and without frequency switching processing for detecting the specific area. Therefore, according to the present embodiment, it is possible to eliminate the need of a control channel for transmitting specific area information and reduce overhead due to frequency switching processing for receiving specific area information in the mobile station. Further, according to the present embodiment, the mobile station does not switch the frequency for receiving specific area information, so that it is possible to reduce power consumed for the detection of the specific area. Further, it is equally possible to shorten the time until a mobile station detects the specific area.

Further, according to the present embodiment, a mobile station is able to diversity-combine a signal received directly from the base station and a relay signal from the relay station, and therefore achieves diversity gain. Consequently, according to the present embodiment, it is possible to improve reception performance of a mobile station.

Although a case has been explained with the present embodiment where relay station 20 adds a frequency offset to a signal transmitted from base station 10, with the present embodiment, the offset that relay station 20 adds to the signal transmitted from base station 10 is not limited to a frequency offset, and, may be a time offset or power offset. Even when relay station 20 adds a time offset or power offset to the signal transmitted from base station 10, the same advantage as in the present embodiment can be provided.

Embodiment 2

With the present embodiment, a case will be explained where an offset in accordance with an increasing or decreasing trend of a hazard level, whether the hazard level in another specific area located in the moving direction of a mobile station (coverage area of another relay station) is higher or lower than the hazard level in a specific area the mobile station is presently located in (coverage area of a relay station), is added to a signal to be relayed.

Similar to Embodiment 1, when relay station 20 receives the signal from base station 10 and relays the signal to mobile station 30, relay station 20 adds frequency offset $\Delta f$ to the signal from base station 10, to shift the center frequency to $f_R$. Here, the sign of $\Delta f$ is determined in accordance with the increasing or decreasing trend of the hazard level with respect to moving direction of mobile station 30. To be more specific, when the hazard level in the moving direction of mobile station 30 shows a decreasing trend (e.g. when mobile station 30 located in a specific area having 30% of a hazard level is approaching a specific area having 10% of a hazard level), relay station 20 determines the sign of $\Delta f$ to be negative (−). That is, as shown in FIG. 2, relay station 20 relays to mobile station 30 a signal having a lower center frequency $f_R$ than the signal having center frequency $f_C$ and transmitted from base station 10. Meanwhile, when the hazard level in the moving direction of mobile station 30 shows an increasing trend (e.g. when mobile station 30 located in a specific area having 30% of a hazard level is approaching a specific area having 70% of a hazard level), relay station 20 determines the sign of $\Delta f$ to be positive (+). That is, as shown in FIG. 6, relay station 20 relays to mobile station 30 a signal having a higher center frequency $f_R$ than the signal having center frequency $f_C$ and transmitted from base station 10.

In this way, relay station 20 controls the magnitude of a frequency offset in accordance with the hazard level in a specific area and controls the sign of the frequency offset in accordance with the increasing or decreasing trend of the hazard level in the moving direction of mobile station 30. Relay station 20 then relays the signal having center frequency $f_R$ to mobile station 30.

When mobile station 30 detects $\Delta f$, mobile station 30 detects the hazard level shown by hazard level information based on the absolute value ($|\Delta f|$) of that $\Delta f$, and predicts the hazard level of the specific area to which the mobile station moves, based on the sign of $\Delta f$ (+ or −).

Figure 6:
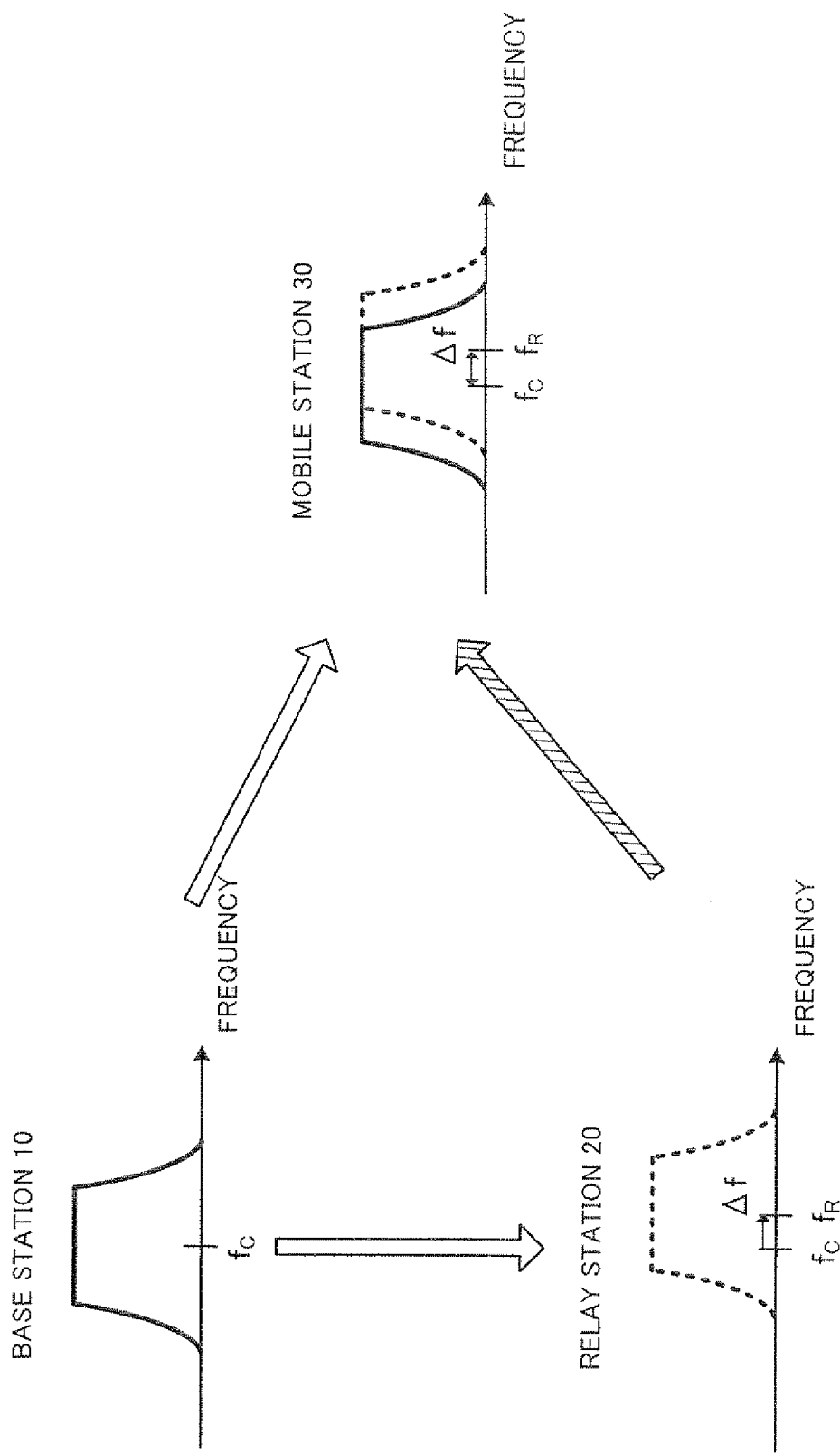
FIG. 6 is an example of transmitting and receiving a signal according to Embodiment 2 of the present invention.

Mobile station 30, located in the overlapping part of base station 10's coverage area 11 and relay station 20's coverage area 21 (specific area), receives both the signal having center frequency $f_C$ and transmitted by base station 10 and the signal having center frequency $f_R$ and relayed by relay station 20, as shown in FIG. 2 (similar to Embodiment 1) or FIG. 6. Accordingly, mobile station 30, located in the overlapping part of base station 10's coverage area 11 and relay station 20's coverage area 21, can detect frequency offset $\Delta f=f_R-f_C$ added by relay station 20. For example, when the sign of $\Delta f=f_R-f_C$ detected from the received signal is negative, that is, as shown in FIG. 2, when mobile station 30 receives a relay signal having a lower center frequency $f_R$ than the signal having center frequency $f_C$ and transmitted from base station 10, mobile station 30 detects that mobile station 30 is moving in a direction where the hazard level decreases, compared with the specific area where the mobile station is located. Further, for example, when the sign of $\Delta f=f_R-f_C$ detected from the received signal is positive, that is, as shown in FIG. 6, when mobile station 30 receives a relay signal having a higher center frequency $f_R$ than the signal having center frequency $f_C$ and transmitted from base station 10, mobile station 30 detects that mobile station 30 is moving in a direction where the hazard level increases, compared with the specific area where the mobile station is located.

Figure 7:
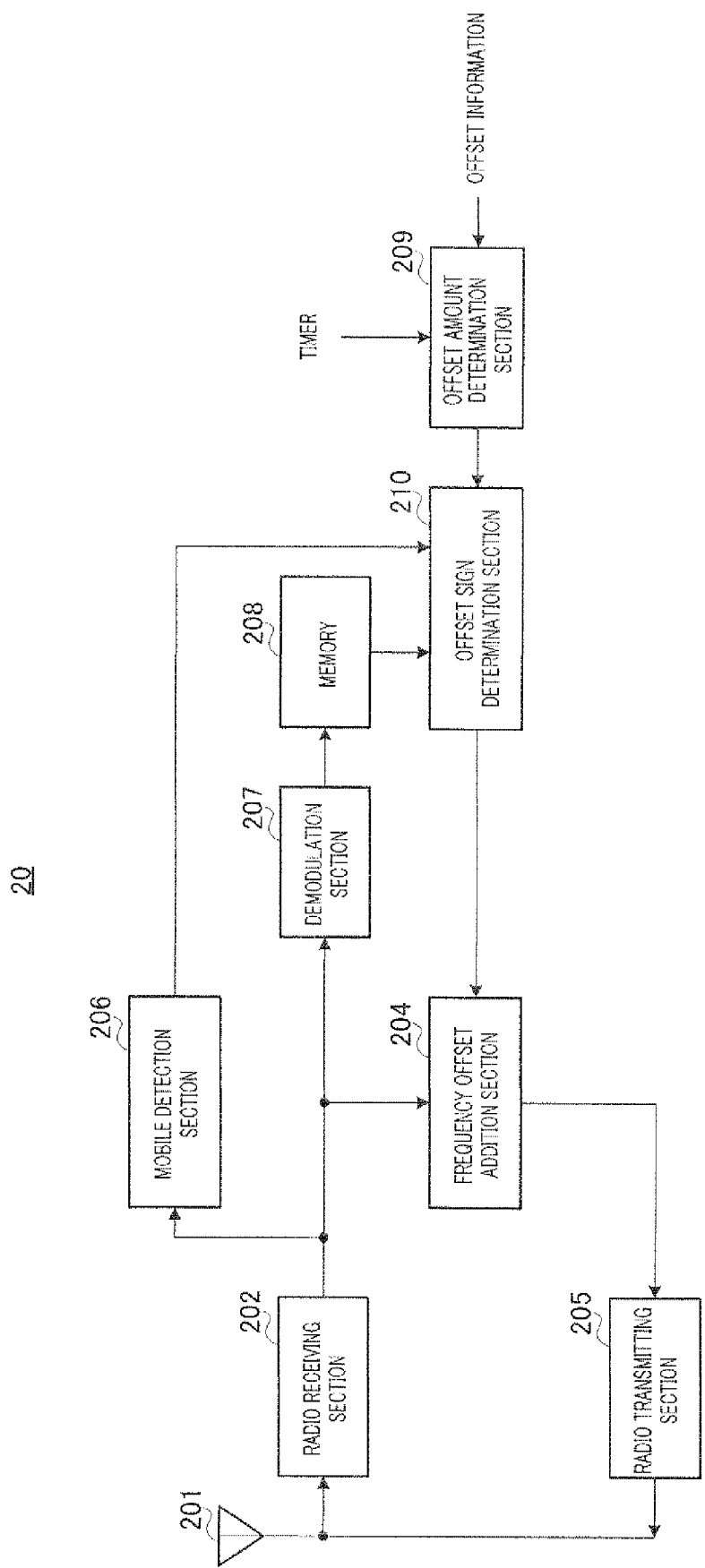
FIG. 7 is a block diagram showing the configuration of the relay station according to Embodiment 2 of the present invention.

Next, the configuration of relay station 20 according to the present embodiment will be described. FIG. 7 shows the configuration of relay station 20 according to the present embodiment. Further, in FIG. 7, the same reference numerals are assigned to the same parts in FIG. 4 (Embodiment 1), and description thereof will be omitted.

Relay station 20 shown in FIG. 7 receives from base station 10 a broadcast channel including neighboring relay station information designating frequency offsets for other relay stations set up around the relay station as shown in FIG. 8. In FIG. 8, assume that the north direction is 0°, the west direction is 90°, the south direction is 180° and the east direction is 270°, where relay station 20 is in the center. Further, relay station 20 receives from base station 10 the location information of mobile station 30 located in coverage area 11 of base station 10.

Based on the location information of mobile station 30 received as input from base station 10, mobile detection section 206 detects the moving direction of mobile station 30 located in relay station's coverage area 21. To be more specific, mobile detection section 206 detects in which direction from the relay station mobile station 30 in the relay station's coverage area shown in the location information is located, Mobile detection section 206 then outputs the detected moving direction of mobile station 30 moves, to offset code determination section 210. Mobile station 30 may measure the location of the mobile station and notify the measured location information of the mobile station of relay station 20.

Demodulation section 207 demodulates the neighboring relay station information (FIG. 8) received as input from base station 10. Memory 208 stores the demodulated neighboring relay station information.

Similar to offset amount determination section 203 (FIG. 4), offset amount determination section 209 determines the amount (|Δf|) of frequency offset Δf adding to the signal from base station 10. Then, the amount of offset |Δf| determined in offset amount determination section 209 is inputted to offset sign determination section 210.

Based on the neighboring relay station information stored in memory 208, the moving direction of mobile station 30 received as input from mobile detection section 206 and the amount of offset |Δf| received as input from offset amount determination section 209, offset sign determination section 210 determines the sign of offset Δf (+ or −). To be more specific, firstly, offset sign determination section 210 specifies the amount of offset for another mobile station located in the moving direction of mobile station 30. Then, offset sign determination section 210 compares the specified amount of offset for another relay station with an amount of offset |Δf| determined in offset amount determination section 209, that is, with the amount of offset for relay station 20. Here, when the amount of offset for relay station 30 is equal to or more than the amount of offset for another relay station, that is, when mobile station 30 is moving in a direction of a decreased hazard level (decreasing trend), offset sign determination section 210 determines the sign for the amount of offset to be negative (−). Meanwhile, when the amount of offset for relay station 30 is less than the amount of offset for another relay station, that is, when mobile station 30 is moving in a direction of an increased hazard level (increasing trend), offset sign determination section 210 determines the sign for the amount of offset to be positive (+). For example, the amount of offset |Δf| determined by offset amount determination section 209 is 3000 Hz (30% of hazard level) and the moving direction θ of mobile station 30 is 100°. In this case, as shown in FIG. 8, the amount of offset for another relay station (60°≦θ<120°) located in the moving direction θ=100° of mobile station 30 is 2000 Hz (20% of hazard level). Accordingly, offset sign determination section 210 decides that the hazard level shows a decreasing trend when mobile station 30 moves from relay station 20 (30% of hazard level) to another relay station (20% of hazard level), and determines the sign for the amount of offset |Δf| to be negative (−). That is, the frequency offset Δf that relay station 20 adds to the signal from the base station is −3000 Hz.

Next, the configuration of mobile station 30 (FIG. 5) according to the present embodiment will be described.

In mobile station 30 shown in FIG. 5, frequency offset detection section 305 detects frequency offset $\Delta f = f_R - f_C$, which is added to the received signal. That is, Δf detected in frequency offset detection section 305 is represented by the absolute value |Δf| and the sign (+ or −).

Based on Δf detected by frequency offset detection section 305, hazard level information detection section 306 detects the hazard level shown by hazard level information and the increasing or decreasing trend of the hazard level in the moving direction of the mobile station. For example, when the detected Δf is −3000 Hz, similar to Embodiment 1, hazard level information detection section 306 detects 30% of the hazard level (=3000 Hz/100). Further, the sign of Δf shows negative (−), so that hazard level information detection section 306 detects that the hazard level in the moving direction of mobile station 30 shows a decreasing trend.

In this way, according to the present embodiment, a relay station determines the amount of offset in accordance with the hazard level in the coverage area of the relay station (specific area) and the sign of offset in accordance with an increasing or decreasing trend of the hazard level in the moving direction of a mobile station. Consequently, according to the present embodiment, a mobile station is able to detect a specific area and the hazard level as in Embodiment 1, and, furthermore, predict an increasing or decreasing trend of hazard level in the moving direction of the mobile station.

Although a ease has been explained with the present embodiment where relay station 20 adds a frequency offset to a signal transmitted from base station 20, with the present embodiment, the offset that the relay station 20 adds to the signal transmitted from base station 10 is not limited to a frequency offset, and, may be a time offset or power offset. Even when relay station 20 adds a time offset or power offset to the signal transmitted from base station 10, the same advantage as in the present embodiment can be provided.

Embodiment 3

With the present embodiment, relay station 20 adds an offset in accordance with the hazard level shown by hazard level information and an offset in accordance with increasing or decreasing trend of the hazard level in the moving direction of mobile station 30, to two different resources (two resources out of frequency resources, time resources and power resources) of a signal to be relayed, respectively.

With the following explanation, a case will be explained where a frequency offset in accordance with a hazard level shown by hazard level information is added to a signal to be relayed and a time offset in accordance with an increasing or decreasing trend the hazard level in a moving direction of mobile station 30 is added to a signal to be relayed.

Figure 9:
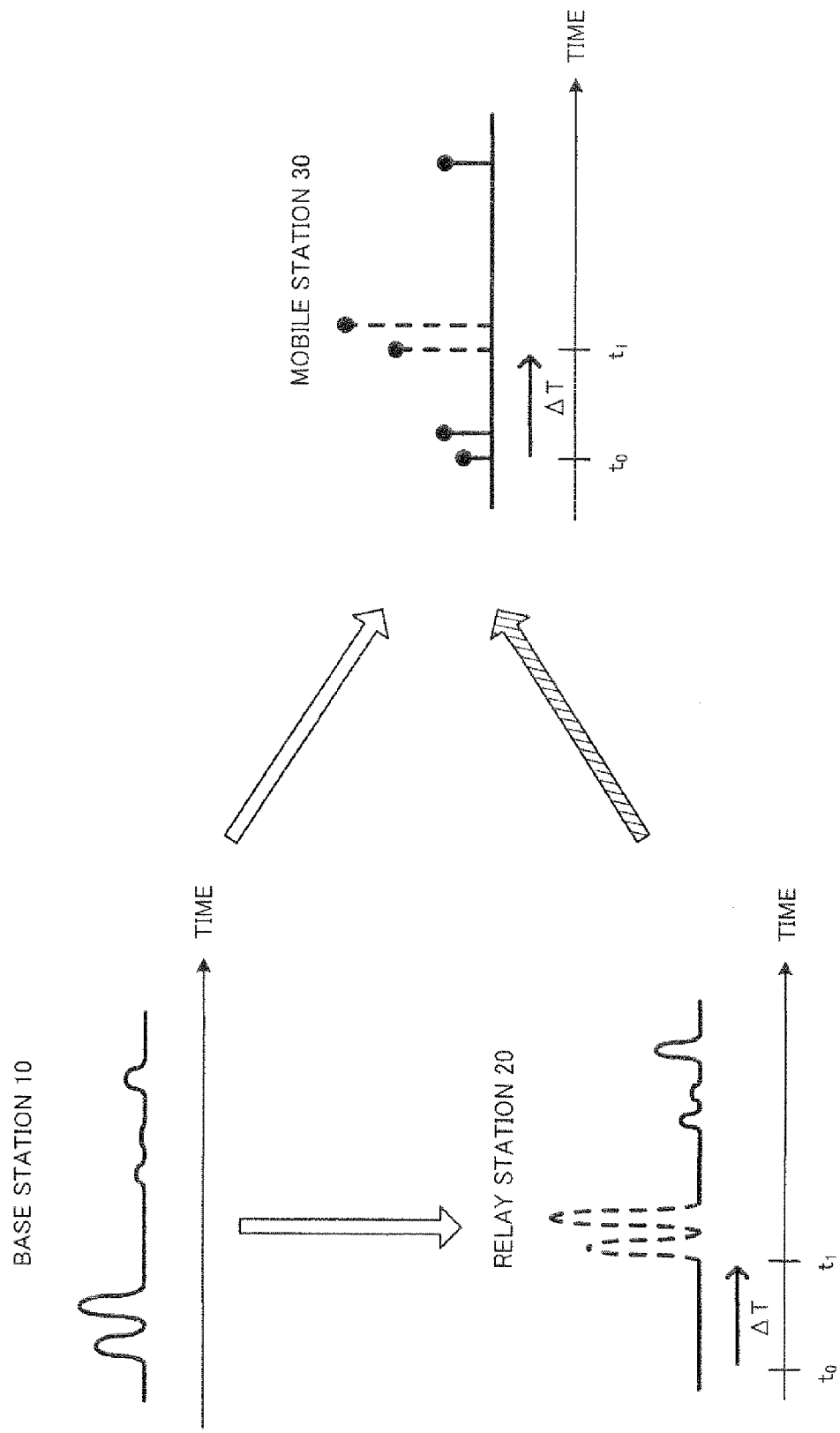
FIG. 9 illustrates an example of transmitting and receiving a signal according to Embodiment 3 of the present invention.

With the present embodiment, relay station 20 receives from base station 10 a signal having a center frequency $f_C$ as shown in FIG. 2, and having a peak at time $t_0$ as shown in FIG. 9.

When relay station 20 receives the signal from base station 10 and relays the signal to mobile station 30, relay station 20 adds frequency offset Δf and time offset Δt to the signal from base station 10, to generate a signal having a center frequency $f_R$ and a peak at time $t_1$. Similar to Embodiment 1, the magnitude of Δf varies depending on the hazard level. Also, the magnitude of ΔT varies depending on an increasing or decreasing trend in the moving direction of mobile station 30. That is, relay station 20 controls the frequency offset in accordance with the hazard level in a specific area and time offset in accordance with the hazard level in the moving direction of mobile station 30. Relay station 20 then relays the signal having a center frequency $f_R$ and a peak at time $t_1$ to mobile station 30.

Mobile station 30 detects whether or not mobile station 30 is located in a specific area based on whether or not frequency offset Δf is added to the received signal or whether or not time offset ΔT is added to the received signal.

Mobile station 30, located in overlapping part of base station's coverage area 11 and relay station 20's coverage area 21, can detect frequency offset $\Delta f = |f_R - f_C|$ added by relay station 20 in the same way as in Embodiment 1. Mobile station 30, located in the overlapping part of base station 10's coverage area 11 and relay station 20's coverage area 21 (specific area), receives both the signal having a peak at time $t_0$ when base station 10 performs transmission and the signal having a peak at time $t_1$ when relay station 20 performs relay. Accordingly, mobile station 30, located in the overlapping part of base station 10's coverage area 11 and the relay station 20's coverage area can detect time offset $\Delta T=|t_1-t_0|$ added by relay station 20.

In LTE, usually, a guard interval $T_{guard}$ is set based on several tens to hundreds of samples, taking into consideration of the maximum multipath delay time $T_{delay\_max}$. That is, to make detection easier, the value of time offset $\Delta T$ added by LTE relay station 20 preferably meets the condition $\Delta T \leq T_{guard} - T_{delay\_max}$. Further, with the present embodiment, $\Delta T_{default}$, which is a value satisfying the above condition, is set, and $\Delta T_{add}$ added to $\Delta T_{default}$ is determined in accordance with an increasing or decreasing trend in the moving direction of mobile station 30. Accordingly, time offset $\Delta T$ adding to a relay signal is $\Delta T_{default} + \Delta T_{add}$. Here, $\Delta T_{add}$=(frequency offset in another relay station−frequency offset in relay station)/1000 [symbols]. When mobile station 30 located in a specific area having 30% of a hazard level is approaching a specific area having 70% of a hazard level, the hazard level shows an increase trend by 40%, so that $\Delta T$ is $\Delta T_{default}$+4 symbols. Similarly, when mobile station 30 located in a specific area having 30% of a hazard level approaching a specific area having 10% of a hazard level, the hazard level shows a decreasing trend by 20%, so that $\Delta T$ is $\Delta T_{default}$−2 symbols. By this means, by the detected time offset $\Delta T$, mobile station 30 is able to detect an increasing or decreasing trend (i.e. increasing trend or decreasing trend) of the hazard level in the moving direction of mobile station 30 and detect how much the hazard level increases or decreases.

Figure 10:
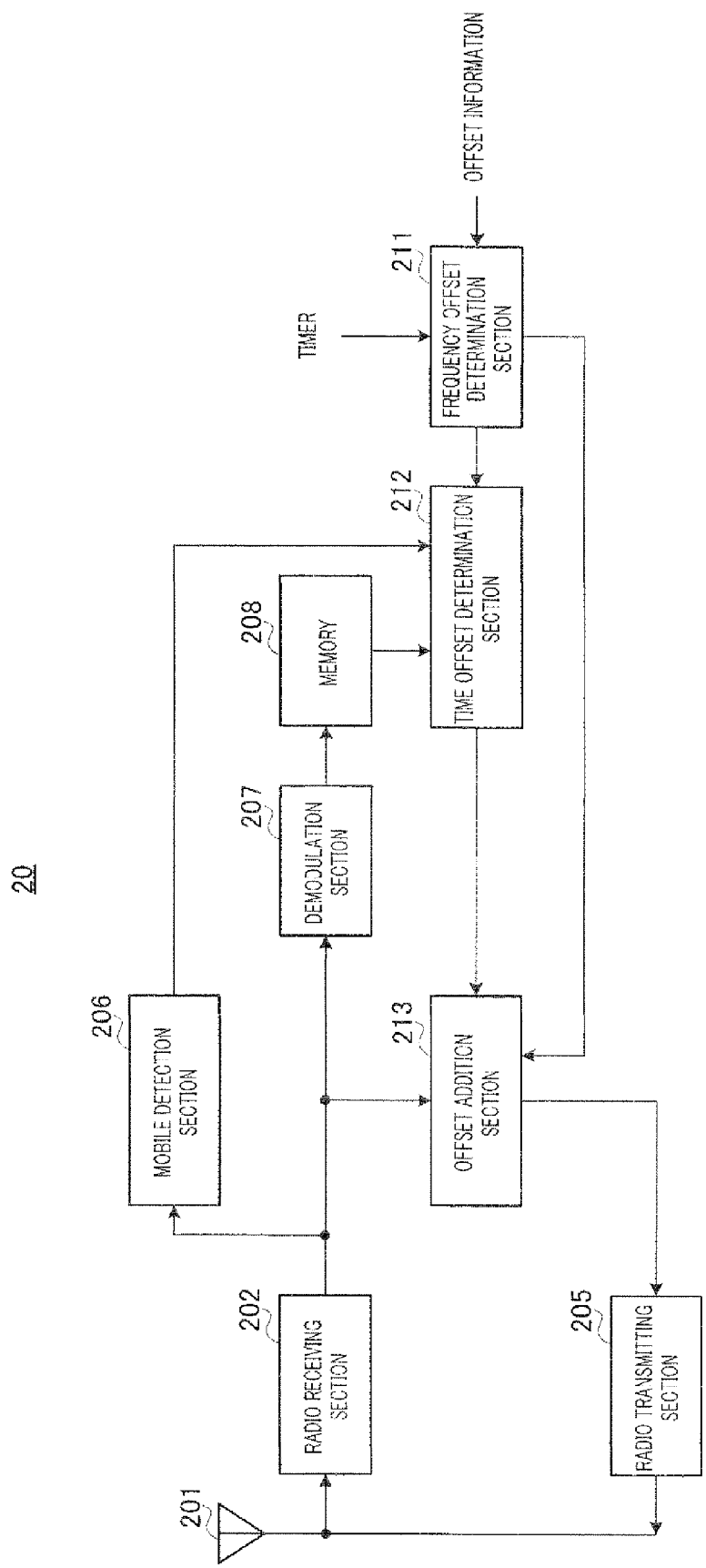
FIG. 10 is a block diagram showing the configuration of the relay station according to Embodiment 3 of the present invention.

Next, the configuration of relay station 20 according to the present embodiment will be described. FIG. 10 shows the configuration of relay station 20 according to the present embodiment. Further, in FIG. 10 the same reference numerals are assigned to the same parts in FIG. 7 (Embodiment 2), and description thereof will be omitted.

In relay station 20 shown in FIG. 10, similar to offset determination section 203 of Embodiment 1, frequency offset determination section 211, which has a table shown in FIG. 3 and designating associations between $\Delta f_{add}$ and time, determines frequency offset $\Delta f$ with reference to the table based on the time shown on the inputted timer and the offset information. $\Delta f$ determined in frequency offset determination section 211 is inputted to time offset determination section 212 and offset addition section 213.

Time offset determination section 212 determines time offset $\Delta T$ based on the neighboring relay station information (FIG. 8) stored in memory 208, the moving direction of mobile station 30 received as input from mobile detection section 206, and frequency offset $\Delta f$ received as input from frequency offset determination section 211. For example, the frequency offset $\Delta f$ determined by frequency offset determination section 211 is 3000 Hz (30% of hazard level) and the moving direction θ of mobile station 30 is 100°. In this case, as shown in FIG. 8, the amount of frequency offset for another relay station located in the moving direction θ=100° of mobile station 30 is 2000 Hz (20% of hazard level). Accordingly, time offset determination section 212 decides that the hazard level shows an decreasing trend by 10% ($\Delta T_{add}$=−1 symbol) when mobile station 30 moves from relay station 20 (30% of hazard level) to another relay station (20% of hazard level), and determines the time offset $\Delta T$ to be $\Delta T_{default}$−1 symbol. $\Delta T$ determined in time offset determination section 212 is inputted to offset addition section 213.

Offset addition section 213 adds $\Delta f$ determined in frequency offset determination section 211 and $\Delta T$ determined in time offset determination section 212 to the signal received as input from radio receiving section 202, and outputs the signal with the offsets to radio transmitting section 205.

Figure 11:
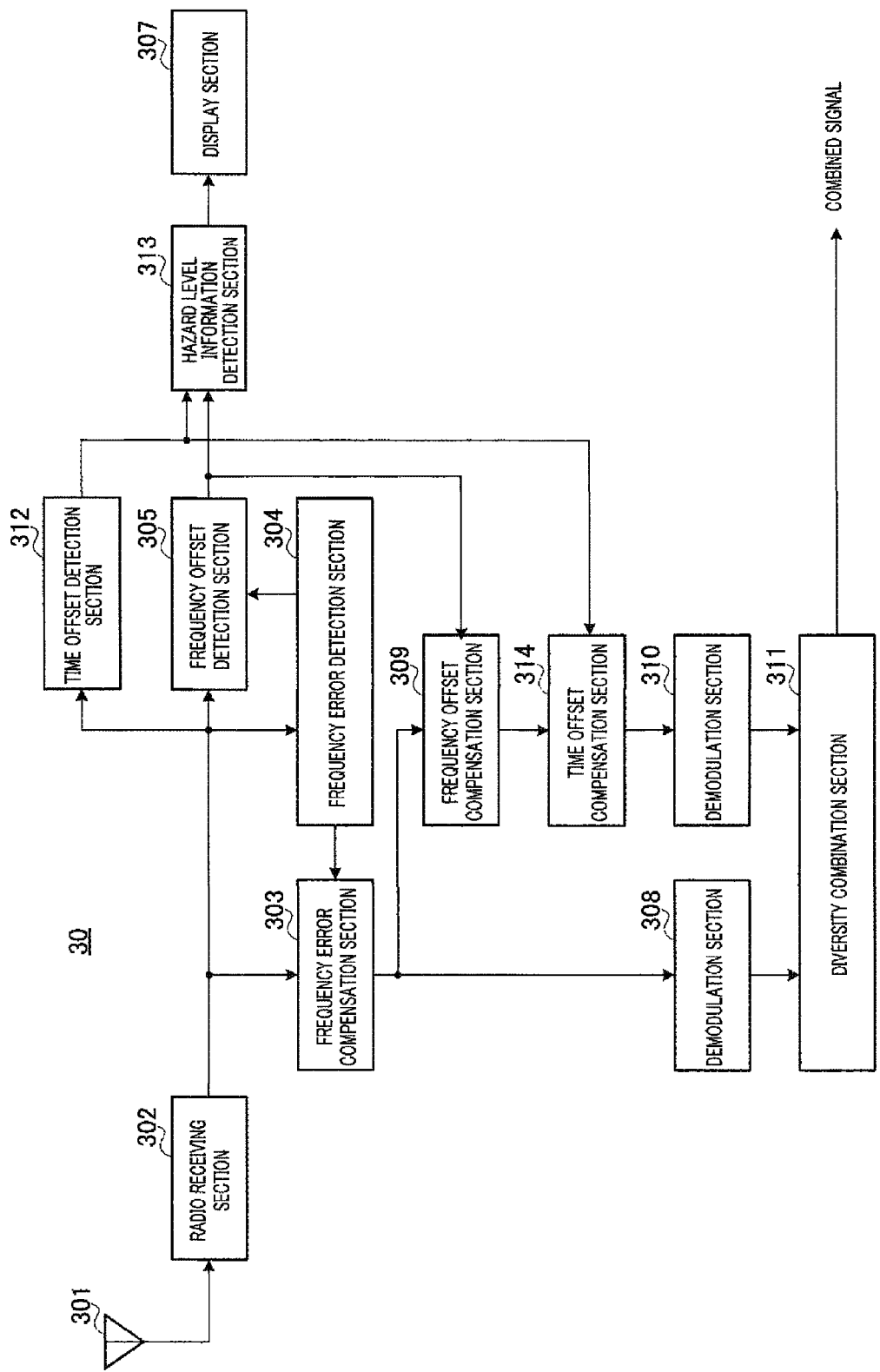
FIG. 11 is a block diagram showing a configuration of the mobile station according to Embodiment 3 of the present invention.

Next, the configuration of mobile station 30 according to the present embodiment will be described. FIG. 11 shows the configuration of mobile station 30 according to the present embodiment. Further, in FIG. 11, the same reference numerals are assigned to the same parts in FIG. 5 (Embodiment 1), and description thereof will be omitted.

In mobile station 30 shown in FIG. 11, time offset detection section 312 detects time offset $\Delta T=|t_1-t_0|$, which is added to the received signal. The detected $\Delta T$ is inputted to hazard level information detection section 313 and time offset compensation section 314.

Time offset compensation section 314 further compensates for the time offset $\Delta T$ with the signal after frequency offset compensation received as input from frequency offset compensation section 309 and outputs the signal after time offset compensation, to demodulation section 310. That is, demodulation section 310 demodulates the signal after frequency offset compensation and time offset compensation.

Similar to hazard level information detection section 306 of Embodiment 1, based on $\Delta f$ detected by frequency offset detection section 305, hazard level information detection section 313 detects the hazard level shown by hazard level information. Further, based on $\Delta T$ detected by time offset detection section 312, hazard level information detection section 313 detects an increasing or decreasing trend of the hazard level in the moving direction of the mobile station. For example, similar to Embodiment 1, when the detected $\Delta f_{offset}$ is 3000 Hz, hazard level information detection section 313 detects the hazard level to be 30% from $\Delta f_{offset}/100$ [%]. Further, hazard level information detection section 313 calculates the increasing or decreasing trend of the hazard level from $T_{offset} \times 10$ [%]. Here, $T_{offset}$ is an estimated additional time offset showing an estimated value of $\Delta T_{add}$ added to $\Delta T_{default}$ in relay station 20, and calculated from $T_{offset}=\Delta T - \Delta T_{default}$. For example, when $T_{offset}$ is −1 symbol, the increasing or decreasing trend of the hazard level is −10% (decreasing trend by 10%). That is, hazard level information detection section 313 detects that the hazard level in the specific area where the mobile station (30% of hazard level) moves is 20% (=30−10) %. Hazard level information detection section 313 then outputs the hazard level information designating the detected hazard level to display section 307.

In this way, according to the present embodiment, a relay station determines a frequency offset in accordance with the hazard level in the coverage area (specific area) of the relay station and a time offset in accordance with an increasing or decreasing trend of the hazard level in the moving direction of a mobile station. By this means, as in Embodiment 2, the mobile station is able to detect the hazard level and the increasing or decreasing trend of the hazard level in the moving direction of the mobile station, and, furthermore, predict the increasing or decreasing trend of the hazard level (hazard level increase or decrease and level of increase or decrease) in the moving direction of the mobile station. That is, by adding an offset in accordance with the hazard level and an offset in accordance with the increasing or decreasing trend, to different resources (here a frequency resource and a time resource), respectively, it is possible to transmit much more hazard level information without performing communication using a control channel. Therefore, according to the present embodiment, the mobile station is able to predict change in a hazard level with higher accuracy.

Although a case has been explained with the present embodiment where relay station 20 adds, to a signal transmitted from base station 10, a frequency offset in accordance with the hazard level and a time offset in accordance with the increasing or decreasing trend in the moving direction of mobile station 30, with the present embodiment, the offset that relay station 20 adds in accordance with the hazard level is not limited to a frequency offset, and, may be a time offset or power offset. Further, the offset that relay station 20 adds in accordance with the increasing or decreasing trend in the moving direction of mobile station 30 is not limited to the frequency offset, and, may be a time offset or power offset.

Embodiments of the present invention have been explained.

Further, although cases have been explained above with the embodiments where LTE is explained as one example of RATs. For example, other RATs include W-CDMA, WLAN, WiMAX and so on.

Further, although cases have been explained with the above embodiments where part of a base station's coverage area includes a specific area entirely (coverage area of a relay station) and part of the base station's coverage area overlaps the specific area entirely (coverage area of the relay station), the present invention may be implemented as described above in cases where part of a base station's coverage area includes part of a specific area (coverage area of a relay station) and part of the base station's coverage area overlaps part of the specific area (coverage area of the relay station).

Further, although cases have been explained with the above embodiments where the relay station determines a frequency offset adding to a relay signal in accordance with the time shown on a timer, with the present invention, a relay station may determine an offset adding to a relay signal in accordance with a date or season in addition to the time. Further, the relay station may not determine a frequency offset in accordance with a timer.

Further, in the above embodiments, hazard levels in the following specific areas will be explained as an example of a hazard level shown by hazard level information. For example, assume that a specific area is a mountain range, how often a dangerous animal (e.g. a bear) appears in the specific area may be a hazard level. Further, assume that a specific area is a mountain range, how often disaster (e.g. an avalanche, landslide and so on) strikes the specific area may be a hazard level. Further, assume that a specific area is an area where landmines are buried, how landmines are buried in the specific area (e.g. density of burial) may be a hazard level.

Further, with the embodiments, although hazard level information has been explained as an example of specific area information, with the present invention, specific area information is not limited to the hazard level information and may only show a level. Now, a case will be explained where a frequency offset is added. For example, traffic information (traffic jam information) showing an increase or decrease of traffic in a specific area may be used as specific area information. For example, traffic is represented from 0 to 100%, and the situation where traffic is the least occupied may be 0% of traffic, and the situation where traffic is the heaviest may be 100% of traffic. Then, an offset $\Delta f$ adding to a relay signal is $\Delta f_{default} + \Delta f_{add}$ as in the above embodiments. Here, $\Delta f_{add} =$ (traffic [%]×100) [Hz]. Accordingly, for example, $\Delta f$ in the case of 10% of traffic is $\Delta f_{default} + 1000$ Hz. By this means, a mobile station is able to detect traffic in a specific area in which the mobile station is located and the increasing or decreasing trend of traffic in the moving direction of the mobile station, without using a control channel. For example, permissible transmission power information showing an increase or decrease of permissible transmission power of a mobile station in a specific area may be used as specific area information. For example, permissible transmission power is represented in 0% to 100%, the least permissible transmission power may be 0% of permissible transmission power and the maximum permissible transmission power may be 100% of permissible transmission power. Then, similar to the above embodiments, an offset $\Delta f$ added to a relay signal is $\Delta f_{default} + \Delta f_{add}$. Here, assume that $\Delta f_{add} =$ (permissible transmission power [%]×100) [Hz]. Accordingly, for example, $\Delta f$ in the case of 10% of permissible transmission power is $\Delta f_{default} + 1000$ Hz. By this means, a mobile station is able to detect permissible transmission power in a specific area in which the mobile station is located or the increasing or decreasing trend of permissible transmission power in the moving direction of the mobile station, without using a control channel. For example, when permissible transmission power in a specific area of a moving direction of a mobile station is small (e.g. near priority seats), it is possible to reduce transmission power of the mobile station in advance.

Further, for example, communication traffic volume information (traffic congestion information) showing an increase or decrease of communication traffic volume in a specific area may be used as specific area information. For example, communication traffic volume is represented from 0 to 100%, and the situation where communication traffic volume is the least occupied may be 0% of communication traffic volume, and the situation where communication traffic volume is the heaviest may be 100% of communication traffic volume. Then, an offset $\Delta f$ added to a relay signal is $\Delta f_{default} + \Delta f_{add}$ as in the above embodiments. Here, $\Delta f_{add} =$ (communication traffic volume [%]×100) [Hz]. Accordingly, for example, $\Delta f$ in the case of 10% of communication traffic volume is $\Delta f_{default} + 1000$ Hz. By this means, a mobile station is able to detect communication traffic volume in a specific area in which the mobile station is located and the increasing or decreasing trend of communication traffic volume in the moving direction of the mobile station, without using a control channel.

Further, a base station in the above embodiments may be referred to as a "Node B" and a mobile station in the above embodiments may be referred to as a "UP." Furthermore, the relay station according to the embodiments is referred to as "repeater," "simple base station," "cluster head," and so on.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. These may be individual chips or partially or totally contained on a single chip.

"LSI" is adopted here but this may also be referred to as "IC," "system LSI," "super LSI," or "ultra LSI" depending on differing extents of integration. Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-046418, filed on Feb. 27, 2008, including the specification, drawings and abstract, is incorporated herein by reference in its entirety.

INDUSTRIAL APPLICABILITY

The present invention is applicable to, for example, communication systems (for example, multihop systems) in which radio communication apparatuses including mobile stations and base stations carry out radio communication via relay stations.

The invention claimed is:

1. A relay station comprising:
a receiver configured to receive a signal from a base station covering a first coverage area;
an adder configured to add to the signal one of a frequency offset and a time offset, in accordance with a level shown by specific area information in a second coverage area partly or entirely included in the first coverage area, the level being a hazard level, a traffic condition, a permissible transmission power or a moving direction of a mobile station in the second coverage area; and
a transmitter configured to transmit the offset-added signal to the mobile station in the second coverage area, wherein:
a sign of the offset is determined in accordance with an increasing or a decreasing of the hazard level.

2. A mobile station comprising:
a receiver configured to receive, in a first coverage area, a signal transmitted from a base station covering the first coverage area, and that receives a signal relayed by a relay station in a second coverage area, partly or entirely included in the first coverage area; and
a detector configured to detect a level shown by specific area information in the second coverage area based on an offset, when one of a frequency offset and a time offset is added to the received signal, the level being a hazard level, a traffic condition, a permissible transmission power or a moving direction of a mobile station in the second coverage area, wherein:
a sign of the offset is determined in accordance with an increasing or a decreasing of the hazard level.

3. The mobile station according to claim 2, further comprising:
a combiner configured to combine the signal after an offset compensation based on the detected level, with the received signal transmitted from a base station.

4. A relay transmission method comprising:
adding to a signal received from a base station covering a first coverage area, one of a frequency offset and a time offset, in accordance with a level shown by specific area information in a second coverage area, partly or entirely included in the first coverage area, the level being a hazard level, a traffic condition, a permissible transmission power or a moving direction of a mobile station in the second coverage area; and
transmitting the offset-added signal to a mobile station in the second coverage area, wherein:
a sign of the offset is determined in accordance with an increasing or a decreasing of the hazard level.

5. A specific area reception method comprising:
receiving, in a first coverage area, a signal transmitted from a base station covering the first coverage area, and receiving a signal relayed by a relay station in a second coverage area, partly or entirely included in the first coverage area; and
when one of a frequency offset and a time offset is added to the received signal, detecting a level shown by specific area information in the second coverage area, based on the offset, the level being a hazard level, a traffic condition, a permissible transmission power or a moving direction of a mobile station in the second coverage area, wherein:
a sign of the offset is determined in accordance with an increasing or a decreasing of the hazard level.

6. A relay station comprising:
a receiver configured to receive a signal from a base station covering a first coverage area;
an adder configured to add to the signal one of a frequency offset and a time offset, in accordance with a level shown by specific area information in a second coverage area partly or entirely included in the first coverage area, the level being a hazard level, a traffic condition, a permissible transmission power or a moving direction of a mobile station in the second coverage area; and
a transmitter configured to transmit the offset-added signal to the mobile station in the second coverage area, wherein:
the frequency offset is added to the signal in accordance with the hazard level and the time offset is added to the signal in accordance with an increasing or a decreasing of the hazard level.

7. A mobile station comprising:
a receiver configured to receive, in a first coverage area, a signal transmitted from a base station covering the first coverage area, and that receives a signal relayed by a relay station in a second coverage area, partly or entirely included in the first coverage area; and
a detector configured to detect a level shown by specific area information in the second coverage area based on an offset, when one of a frequency offset and a time offset is added to the received signal, the level being a hazard level, a traffic condition, a permissible transmission power or a moving direction of a mobile station in the second coverage area, wherein:
the frequency offset is added to the signal in accordance with the hazard level and the time offset is added to the signal in accordance with an increasing or a decreasing of the hazard level.

* * * * *